United States Patent
Lüssi et al.

(10) Patent No.: US 10,390,653 B2
(45) Date of Patent: Aug. 27, 2019

(54) BEVERAGE PREPARATION MODULE HAVING ADDITIONAL MODULES FOR SELF-SERVICE BEVERAGE VENDING MACHINES

(71) Applicant: Schaerer AG, Zuchwil (CH)

(72) Inventors: André Lüssi, Jegenstorf (CH); Bruno Mosimann, Burgdorf (CH); Peter Egli, Herrenschwanden (CH); Bruno Aeberhard, Zuchwil (CH)

(73) Assignee: SCHAERER A.G., Zuchwil (CH)

( * ) Notice: Subject to any disclaimer, the term of this patent is extended or adjusted under 35 U.S.C. 154(b) by 59 days.

(21) Appl. No.: 14/378,449

(22) PCT Filed: Feb. 12, 2013

(86) PCT No.: PCT/EP2013/052780
§ 371 (c)(1),
(2) Date: Aug. 13, 2014

(87) PCT Pub. No.: WO2013/124188
PCT Pub. Date: Aug. 29, 2013

(65) Prior Publication Data
US 2015/0027315 A1    Jan. 29, 2015

(30) Foreign Application Priority Data

Feb. 21, 2012 (CH) ...................... 0222/12

(51) Int. Cl.
*A47J 31/40* (2006.01)
*A47J 31/42* (2006.01)
(Continued)

(52) U.S. Cl.
CPC ......... *A47J 31/4403* (2013.01); *A47J 31/401* (2013.01); *A47J 31/42* (2013.01);
(Continued)

(58) Field of Classification Search
CPC ...... A47J 31/4403; A47J 31/401; A47J 31/42; A47J 31/4489; A47J 31/46; A47J 31/545; A47J 31/60; G06Q 20/18
(Continued)

(56) References Cited

U.S. PATENT DOCUMENTS 4,211,342 A    7/1980  Jamgochian et al.
4,550,651 A    11/1985 Haynes
(Continued)

FOREIGN PATENT DOCUMENTS

CH    682798 A5    11/1993
CN    101466292 A   6/2009
(Continued)

OTHER PUBLICATIONS

International Search Report dated Aug. 8, 2013 for PCT/EP2013/052780.

(Continued)

*Primary Examiner* — Ibrahime A Abraham
*Assistant Examiner* — Spencer H. Kirkwood
(74) *Attorney, Agent, or Firm* — Pearne & Gordon LLP

(57) ABSTRACT

The disclosure relates to a beverage preparation module intended for installation in a self-service beverage vending machine. According to the disclosure, a water connection and a preparation device for preparing a beverage by means of water provided at the water connection are provided. Beverage preparation parameters can be transmitted to a control unit via a communication interface. The control unit is configured to control the preparation device in order to prepare a beverage based on the beverage preparation parameters. A beverage outlet for discharging the beverage prepared by the preparation device is provided. In one
(Continued)

embodiment, at least one additional module interface is provided for connecting the control unit to at least one additional module.

25 Claims, 4 Drawing Sheets

(51) Int. Cl.
    *A47J 31/44* (2006.01)
    *A47J 31/46* (2006.01)
    *A47J 31/54* (2006.01)
    *A47J 31/60* (2006.01)
    *G06Q 20/18* (2012.01)

(52) U.S. Cl.
    CPC ........... *A47J 31/4489* (2013.01); *A47J 31/46* (2013.01); *A47J 31/545* (2013.01); *A47J 31/60* (2013.01); *G06Q 20/18* (2013.01)

(58) Field of Classification Search
    USPC .......................................... 99/284, 290, 280
    See application file for complete search history.

(56) References Cited

U.S. PATENT DOCUMENTS

| | | | |
|---|---|---|---|
| 4,852,472 A | 8/1989 | In-Albon et al. | |
| 5,189,949 A | 3/1993 | Apa | |
| 5,312,020 A | 5/1994 | Frei | |
| 5,724,883 A | 3/1998 | Usherovich | |
| 5,855,162 A | 1/1999 | Bauer et al. | |
| 5,957,033 A | 9/1999 | In-Albon | |
| 6,182,555 B1 | 2/2001 | Scheer et al. | |
| 6,345,729 B1 | 2/2002 | Santy, Jr. | |
| 2002/0134248 A1 | 9/2002 | Eugster | |
| 2003/0052206 A1 | 3/2003 | Fouquet | |
| 2003/0079612 A1* | 5/2003 | Con ................... | A47J 31/4485 99/275 |
| 2004/0118291 A1 | 6/2004 | Carhuff et al. | |
| 2005/0045655 A1 | 3/2005 | Santy, Jr. | |
| 2006/0230943 A1 | 10/2006 | Stieger et al. | |
| 2006/0286262 A1 | 12/2006 | Stearns et al. | |
| 2007/0202234 A1 | 8/2007 | Ludwig | |
| 2009/0214742 A1 | 8/2009 | Peden et al. | |
| 2009/0293733 A1 | 12/2009 | Martin et al. | |
| 2010/0162898 A1 | 7/2010 | Mahlich | |
| 2010/0212508 A1 | 8/2010 | Büttiker | |
| 2010/0276452 A1 | 11/2010 | Vesborg et al. | |
| 2011/0014339 A1 | 1/2011 | Stahl et al. | |
| 2011/0045152 A1 | 2/2011 | Stutz et al. | |
| 2011/0301738 A1* | 12/2011 | Freeman ................... | B23C 3/35 700/106 |
| 2012/0006204 A1* | 1/2012 | Eidenschink ......... | A47J 31/407 99/279 |
| 2012/0285966 A1 | 11/2012 | Mori et al. | |
| 2013/0085874 A1 | 4/2013 | Gagne et al. | |
| 2013/0087050 A1 | 4/2013 | Studor et al. | |
| 2013/0263745 A1* | 10/2013 | Bombeck ............... | A47J 31/20 99/293 |
| 2013/0319252 A1 | 12/2013 | Castelli et al. | |
| 2015/0020691 A1 | 1/2015 | Midden et al. | |
| 2015/0102062 A1 | 4/2015 | Mosimann et al. | |

FOREIGN PATENT DOCUMENTS

| | | |
|---|---|---|
| CN | 101827779 A | 9/2010 |
| DE | 8411684 U1 | 9/1984 |
| DE | 8907183 U1 | 7/1989 |
| DE | 4137324 C1 | 2/1993 |
| DE | 20102048 U1 | 1/2002 |
| DE | 102004025037 A1 | 12/2005 |
| DE | 202007008814 U1 | 11/2007 |
| DE | 102007060476 A1 | 2/2009 |
| DE | 202011051719 U1 | 1/2012 |
| DE | 202011051719 U1 | 3/2012 |
| DE | 202008018339 U1 | 3/2013 |
| EP | 0373985 A1 | 6/1990 |
| EP | 0528758 A1 | 2/1993 |
| EP | 0761150 A1 | 3/1997 |
| EP | 0820715 A1 | 1/1998 |
| EP | 1 352 599 A1 | 10/2003 |
| EP | 1626375 A1 | 2/2006 |
| EP | 2011421 A1 | 1/2009 |
| EP | 2011422 A1 | 1/2009 |
| EP | 2030538 A2 | 3/2009 |
| EP | 2036466 A1 | 3/2009 |
| EP | 2078481 A1 | 7/2009 |
| EP | 2119383 A1 | 11/2009 |
| EP | 2130466 A1 | 12/2009 |
| EP | 2189085 A1 | 5/2010 |
| EP | 2198762 A1 | 6/2010 |
| EP | 2220972 A1 | 8/2010 |
| EP | 2238876 A2 | 10/2010 |
| EP | 2412280 A1 | 2/2012 |
| EP | 2478803 A1 | 7/2012 |
| EP | 2268175 B1 | 5/2013 |
| FR | 2544185 B3 | 3/1985 |
| JP | 10287394 | 10/1998 |
| JP | 2009255942 A | 11/2009 |
| WO | 9302605 A1 | 2/1993 |
| WO | 93/07792 A1 | 4/1993 |
| WO | 9307792 A1 | 4/1993 |
| WO | 0174211 A1 | 10/2001 |
| WO | 2005113411 A2 | 12/2005 |
| WO | 2006090183 A2 | 8/2006 |
| WO | 2006135864 A2 | 12/2006 |
| WO | 2007072374 A2 | 6/2007 |
| WO | 2007/141334 A1 | 12/2007 |
| WO | 2008015097 A2 | 2/2008 |
| WO | 2009027259 A2 | 3/2009 |
| WO | 2009056426 A1 | 5/2009 |
| WO | 2009/074555 A2 | 6/2009 |
| WO | 2009081299 A1 | 7/2009 |
| WO | 2009130099 A1 | 10/2009 |
| WO | 2009140349 A2 | 11/2009 |
| WO | 2010026045 A1 | 3/2010 |
| WO | 2011/135479 A1 | 11/2011 |
| WO | 2011139151 A1 | 11/2011 |
| WO | 2012036635 A1 | 3/2012 |
| WO | 2013117362 A1 | 8/2013 |

OTHER PUBLICATIONS

International Search Report dated Mar. 28, 2013 for PCT/EP2013/052779.
International Search Report dated May 16, 2013 for PCT/EP2013/057911.
International Search Report and Written Opinion dated Apr. 21, 2015 for PCT/EP2015/000309.

* cited by examiner

BEVERAGE PREPARATION MODULE HAVING ADDITIONAL MODULES FOR SELF-SERVICE BEVERAGE VENDING MACHINES

TECHNICAL FIELD

The invention relates to a beverage preparation module which is provided for installation in a self-service beverage vending machine. The invention further relates to additional modules for a beverage preparation module, and an outflow module for a beverage preparation module. Furthermore, the invention relates to a self-service beverage vending machine, and a computer program product which includes a computer-readable medium having a computer program stored thereon for operating a beverage preparation module.

BACKGROUND INFORMATION

Self-service beverage vending machines are known in the prior art which are manufactured in large numbers at relatively low cost. Such vending machines offer a user various freshly prepared beverages, for example cafe au lait, cappuccino, latte macchiato, hot chocolate, instant soup, etc., at a reasonable price. After payment using a payment system such as a currency validation system, an electronic payment system, etc., the user is provided with the desired beverage in a drinking cup, for example, which is often automatically provided upon purchase of the beverage. However, the quality of the beverages, in particular coffee beverages, in self-service beverage vending machines is not always satisfactory, since the beverage is prepared by mixing powder with hot water. The use of powder, however, has the advantage that a comparatively large number of different beverages may be cost-effectively provided.

High-quality beverages are offered to a user in localities such as bars or restaurants, in which the beverage is prepared using a hand-operated, high-quality specialty machine, for example. High-quality coffee beverages may be prepared in particular using hand-operated coffee machines. However, these machines require a significant level of effort for operation and maintenance, and are difficult for untrained persons to operate. Although beverages prepared in this way are of high quality, they are relatively costly.

Self-service coffee vending machines for preparing low-cost high-quality coffee beverages are likewise known. Such self-service vending coffee machines are manufactured based on a specification which meets the requirements of a given location or location category. Location categories include, for example, schools, workplaces, recreational centers, museums, offices, etc. Depending on the location or location category, it may be necessary to offer fresh milk, powdered milk, several varieties of coffee, or additives such as powdered chocolate or syrup. After the requirements are established, the components of the self-service coffee machine are selected and used to produce the appropriate self-service coffee vending machine which provides the desired selection of beverages. However, such self-service coffee vending machines are not as well suited for mass production, since the specifications for various locations or location categories are very different. In order to meet all the requirements of locations or location categories, an unmanageable number of different self-service coffee vending machines would be necessary. In addition, depending on the location or location category, there is a requirement not only for the design of a self-service coffee vending machine, but also for storage or counter space coordinated with same.

Compared to self-service beverage vending machines, the costs of such self-service coffee vending machines are higher. On the other hand, an appealing variety of different high-quality beverages is offered.

US 2009/0293733 A1 discloses a self-service coffee vending machine by means of which a coffee beverage is prepared based on fresh ingredients such as freshly ground coffee or fresh milk. The vending machine has a dispensing mode for the preparation of coffee beverages according to the instructions from a user. In addition, the vending machine has a cleaning mode for automatic cleaning. A switch is made between the dispensing mode and the cleaning mode according to a time schedule or based on sensor data, thus ensuring that cleaning agents are not dispensed into the coffee beverage following the cleaning mode.

U.S. Pat. No. 4,211,342 discloses a self-service beverage vending machine for hot and cold beverages. Containers are provided for chocolate, coffee, sugar, creamer, etc. in dried form which are mixed with water during preparation of a beverage. The self-service beverage vending machine also has a $CO_2$ cartridge, multiple syrup containers, and a cooling device.

WO 2006/135864 discloses a self-service coffee machine which includes a coffee brewing system, multiple flavoring reservoirs, and a mixing chamber. Milk, steam, and flavorings may be mixed in the mixing chamber. A Venturi device allows production of hot or foamed milk. Flavored lattes, cappuccinos, etc. may be prepared. Expandability or designs having different beverage selections are not provided.

WO 93/07792 discloses a coffee machine having a fresh water container, a coffee grounds container, a residual water container, a grinder, control and heating elements, and a brewing device. The brewing device and a drive device may be partially pulled out of the machine; in addition, there is an operative connection with electrical power for carrying out function testing. The modular construction simplifies the cleaning, maintenance, repair, and testing operations. Expandability or adaptation to different locations having different requirements for the selection of beverages is not provided.

EP 0 761 1 50 discloses a coffee machine having a extraction device, a control unit, and a hot water supply as independently designed modules which in the inserted state are coupled to a plug-in part which is mounted on the housing frame. A defective module may be replaced without assistance from a service technician. Expandability or designs having different beverage selections are not provided.

CH 682798 discloses a coffee machine composed of multiple modules which are insertable into a frame. As a central module, a coffee brewing module having two brewing stations is provided, on which essentially all heatable units are combined. Good accessibility and a compact design with optimal brewing conditions are achieved. Expandability or designs having different beverage selections are not provided.

U.S. Pat. No. 5,957,033 discloses a coffee machine having multiple modules which in the inserted state cooperate with a plug which is attached to the housing. The coffee machine is very easy to assemble, and a defective module may be replaced without a service technician. Expandability or designs having different beverage selections are not provided.

DESCRIPTION OF THE INVENTION

It is an object of the invention to provide a beverage preparation module, additional modules, and an outflow module for installation in a self-service beverage vending machine which at least avoid certain disadvantages of the prior art or which are improved over same. It is an object of the invention in particular to provide a beverage preparation module, additional modules, and an outflow module for installation in a self-service beverage vending machine, by means of which a self-service beverage vending machine for the preparation of high-quality beverages at different locations or location categories is manufacturable in a cost-effective manner.

This object is achieved in particular by the features defined in the independent claims.

A beverage preparation module is provided for installation in a self-service beverage vending machine, and includes the following: a water connection and a preparation device for preparing a beverage using water supplied to the water connection, a communication interface, and a control unit to which beverage preparation parameters are transmittable via the communication interface, and which is configured for controlling the preparation device in order to prepare a beverage based on the beverage preparation parameters, and a beverage outlet for discharging the beverage prepared by the preparation device. Depending on the desired offering of beverages, additional modules may be selected and set up during the manufacture of a self-service beverage vending machine. During operation of the self-service beverage vending machine, the beverage offerings may be easily adapted to changed needs by exchanging additional modules. The communication interface is configured for transmitting beverage preparation parameters which are created, for example, on an operating unit of a beverage vending machine. The control unit evaluates the transmitted beverage preparation parameters, whereupon a beverage is prepared. The communication interface is therefore preferably optimized for transmitting beverage preparation parameters.

The beverage preparation module preferably includes at least one additional module interface for connecting the control unit to at least one additional module. The control tasks of the additional modules may thus be performed by the beverage preparation module. Alternatively, the control of the additional modules may be performed by any other control unit, for example by an operating element of a self-service beverage vending machine.

The beverage preparation module preferably includes at least one additional fluid interface for connecting the water connection and/or the preparation device to at least one additional module. The fluid-based devices, for example hot water devices or steam devices, which are present in the beverage preparation module may also be utilized by the additional modules to prepare beverages or portions of beverages, for example foamed milk, instant soup based on powder and hot water, etc.

The beverage preparation module preferably includes at least one of the following components: a water pump, a coffee boiler, a hot water boiler, a steam boiler, a coffee brewing unit, a coffee grinder, a drive device for a coffee brewing unit, a coffee grounds removal device, and a service operating unit. The beverage preparation module includes the components for preparing high-quality coffee. For many beverages, a high-quality coffee is the basis for obtaining a high-quality beverage. Such a beverage preparation module thus offers an often-desirable basis for preparing a high-quality beverage.

An additional module interface is preferably set up on the beverage preparation module for connecting at least one of the following additional modules: a milk module, a powder module, a syrup module, and a cleaning module. A wide variety for the beverage selection is already provided by means of these additional modules. The milk module may be used to prepare hot milk for hot chocolate or cafe au lait. The powder module allows preparation of beverages, such as instant soup, which are producible by mixing powder and hot water. The syrup module may be used in particular to refine the taste of beverages by adding concentrated flavored syrups.

At least one additional fluid interface is preferably set up on the beverage preparation module for one of the following connections: between a hot water boiler of the preparation device and a powder module, between a steam boiler of the preparation device and a milk module, between the preparation device and a cleaning module, between a cleaning module and a milk module, and between a cleaning module and an outflow module. The additional fluid interfaces may be implemented multiple times, and back-up interfaces may be provided. Supplying additional modules with hot water or steam may be flexibly ensured during the manufacture of a self-service beverage vending machine and during operation thereof.

The beverage preparation module preferably includes a module housing which in particular has a sealed design. The module housing may be made of a stable, lightweight material such as aluminum. The beverage preparation module thus becomes a sealed unit which is installable in self-service beverage vending machines, thus protecting the components of the beverage preparation unit during installation and operation. In particular splash protection may be ensured by means of a sealed module housing. The components of the beverage preparation module are thus protected in particular during refilling of ingredients or during cleaning operations.

The beverage preparation module is preferably completely or partially openable only using a special tool. It may thus be ensured that the beverage preparation module may be opened completely or partially only by trained service personnel. Other persons who are able to open the self-service beverage vending machine, such as operating personnel who fill ingredient containers, have no, or only partial, access to the components of the beverage preparation module.

The beverage preparation module preferably includes a monitoring interface for data transmission using a remote data transmission device, such as a computer center, for monitoring beverage preparation modules. Operating data such as the number of beverages dispensed, status of the components of the beverage preparation module, number and type of additional modules, filling level of ingredient containers of the additional modules and of the beverage preparation module, etc., may be centrally monitored in this way. In one embodiment variant it is provided that the operating data are queried by the control center. In another embodiment variant, the operating data are transmitted from the beverage preparation module to the control center, for example at regular time intervals, for example. The communication between the beverage preparation module and the control center may take place via an Internet Protocol (IP)-based network, for example.

The beverage preparation module preferably includes a data memory for storing operating data such as the number of prepared beverages or the filling level of ingredient containers, and/or for storing beverage recipe data. The data may be stored on a regular basis. Thus, an operating history of the beverage preparation module may be compiled which, for example, may be evaluated in case of malfunctions, or which may be used to make projections concerning the future availability of the beverage preparation module. The operating data may be additionally collected by additional modules connected to the beverage preparation module and by the outflow module, as a result of which the malfunction evaluation or the projections may be further expanded or improved.

The beverage preparation module preferably includes a cleaning software module for automatically cleaning the beverage preparation module and, if necessary, additional modules connected thereto. In particular, a cleaning module as an additional module which is configured for dispensing cleaning agent may be connected to the beverage preparation module. The control is carried out by the cleaning software module. Other components such as the hot water, steam, etc. may be used during the cleaning. In one embodiment variant, the cleaning software module includes various cleaning programs which are selected on the basis of stored operating data.

The beverage preparation module preferably includes a coordination software module for coordinating the preparation of beverages with external devices which cooperate with the beverage preparation module. The coordination software module collects data concerning the beverage preparation module, the additional modules, and the outflow module. Based on an evaluation of these data, the coordination software module coordinates the preparation of beverages with an external device such as an operating control of a self-service beverage vending machine. If on the basis of collected data it is recognized that it is no longer possible to prepare, or completely prepare, a beverage, for example because of a blockage after purchase of the beverage, or the purchase options are no longer displayed to the user, the coordination software module carries out appropriate coordination with the operating device.

The beverage preparation module preferably includes a function test software module for establishing which functions are carried out by the beverage preparation module and which functions are carried out by external devices which cooperate with the beverage preparation module. The processors installed in the external devices may have high performance capability, which may be utilized so that, for example, functions which are not safety-relevant are carried out externally. If the beverage preparation module is installed in a self-service beverage vending machine which has a powerful self-service operating element, telemetry data, for example, may be transmitted by the self-service operating element to a control center. The beverage preparation module is thus relieved of the tasks which are necessary for reliable transmission of telemetry, such as checking whether a connection to a control center may be established, whether a database of the control center, for example, is available, or whether the control center has completely received the telemetry data.

The beverage preparation module preferably includes a billing software component for billing prepared beverages. The billing software component is designed as a multidrop bus (MDB) software component, for example. The MDB software component allows a connection to customary billing systems and ensures robust billing of the purchased beverages.

The beverage preparation module preferably includes an assistance software module for determining operation tasks which are to be carried out by operating personnel. The assistance software module is configured for recording operating data such as the consumption and the filling level of ingredients. Based on an evaluation of these data, the assistance software module displays to the operating personnel which ingredients need to be refilled or exchanged. If ingredients are present only in small quantities, this may be explicitly indicated by the assistance software module. The operating personnel may then independently decide whether refilling or exchange should be carried out immediately or at a later time. In addition to displaying the filling level, the assistance software module may also make a projection and display when the future refilling or exchange of ingredients is to be expected. The operating personnel may take these data and use them for coordinating work plans. The availability and the maintenance costs are thus additionally optimized.

The beverage preparation module preferably includes an equipment module for determining the best suited additional modules and/or ingredient quantities. The equipment module in particular records consumption data of the ingredients. Based on the consumption of the ingredients, the equipment module determines which ingredients in which quantities should be present, which ingredients are no longer to be offered, or which ingredients may be offered once again.

In addition to a beverage preparation module, the invention further relates to an additional module for a beverage preparation module. The additional module includes an additional module interface for connection to the beverage preparation module, the additional module interface being configured for transmitting electrical power and/or electrical control signals.

The additional module preferably includes a water interface and/or a steam interface for connection to a water interface and/or steam interface, respectively, of the beverage preparation module. Devices which are present in the beverage preparation module may thus also be utilized by the additional module, and do not have to be separately mounted in the additional module.

The additional module preferably includes one of the following module functions: milk module, powder module, syrup module, cleaning module. These functions allow a flexible selection of different beverages which may be easily adapted to the desired requirements, depending on the location or location category.

In addition to a beverage preparation module and an additional module, the invention relates to an outflow module for a beverage preparation module and, if necessary, one or more additional modules. The outflow module includes at least one of the following features: milk duct, steam duct, milk-steam mixing chamber, powdered beverage duct, coffee duct. The outflow module cooperates flexibly with the beverage preparation module and the additional modules selected for equipping a self-service beverage vending machine, and mixes the individual components necessary for preparing a beverage, thus ensuring high quality of the beverage.

One or more components such as a milk foamer head is/are preferably exchangeably situated on the outflow module as a consumable part. To ensure the quality of the prepared beverage, components of the outflow module which cannot be cleaned any arbitrary number of times are replaced. In one preferred embodiment variant, the milk foaming head relates to a milk foaming device such as that known from German Utility Model 20 2011 051719.5 by the present applicant. With regard to the design and mode of operation of such a milk foaming device, integral reference is made to the above-referenced patent applications. The ease of exchangeability and secure fastening of the milk foaming head together with the flexible design for the foam production are particularly advantageous with respect to the present requirements.

The outflow module combines the beverage portions produced in the beverage preparation module and in the additional modules, and discharges them into a cup in which the actual mixing of the beverage portions to produce the completely prepared beverage takes place. Only cold milk, either foamed or unfoamed, is provided in the milk module. The milk foaming head of the outflow module is used to heat the foamed or the unfoamed milk with steam, as needed. This results in a total of four variants of milk which are available for preparing beverages: 1. cold milk, 2. cold foamed milk, 3. hot milk, 4. hot foamed milk. This expands the variety of beverages which may be provided at a location or for a location category.

In one embodiment, the control unit of the device preparation module is configured not only for controlling the device preparation module, but also for controlling the additional modules and the outflow module. The control connections between the units allow the control unit of the device additional module to transmit a pulse width modulation (PWM) signal, for example, which in particular is evaluated by the additional modules for controlling a motor. In one embodiment variant, the control is carried out by directly writing into a memory of the additional module or of the outflow module, which evaluates the written content and, based on the evaluation, carries out control of the components situated in the additional module or the outflow module. Thus, for example, the control unit may send a command to an additional module, designed as a syrup module, to dispense a given quantity of syrup, and the command is evaluated by the syrup module, and the requested quantity of syrup is dispensed.

In addition to a beverage preparation module, an additional module, and an outflow module, the invention further relates to a self-service beverage vending machine having a beverage preparation module and, if necessary, one or more additional modules. The beverage preparation module includes a beverage cabinet, a holder for a beverage preparation module, and one or more holders for one or more additional modules.

The holder for the beverage preparation module and/or one or more additional modules is preferably designed as a suspension device on the self-service beverage vending machine. In particular, a wall furnished with a hole pattern is provided in the self-service beverage vending machine. Suspension devices on which the beverage preparation module, additional modules, and/or the outflow module may be hung may be mounted in the holes. The suspension device may be designed in the shape of a keyhole which is mounted on the self-service beverage vending machine and which is configured for mounting a detachable screw which is affixed to an additional module, the detachable screw subsequently being retightened. This results in rapid and flexible attachment in the self-service beverage vending machine. In addition, optimal use may be made of the space, since the hole pattern allows sufficiently fine mutual alignment of the individual modules. The additional modules are subsequently connected to the beverage preparation module, in particular via electrical lines and hoses. The outflow module is connected, if necessary, to the beverage preparation module via electrical lines, and to the beverage preparation module and the additional modules via hoses. Manufacture of the self-service beverage vending machine is therefore very simple. In addition, during operation the self-service beverage vending machine may be adapted very easily to changed requirements concerning the desired beverages, in that, for example, one additional module may be removed by simply unhanging it from the suspension device, and another additional module may be mounted by simply hanging it in the suspension device.

A self-service operating element, in particular a touchscreen and preferably a personal computer connected thereto, for inputting beverage preparation parameters and initiating the preparation of a beverage is preferably provided on the self-service beverage vending machine. The self-service operating element is easily operable by consumers, and has an appealing design. In particular by use of a touchscreen and a computer connected thereto, this results in particularly attractive options in particular regarding intuitive operability, adaptation to the offered beverages, and display of additional information. Advertising may be displayed on the touchscreen which results in additional revenue for the company operating the self-service beverage vending machine. The touchscreen may be easily adapted to the beverage selection or the time of day. Thus, in the morning the selection of coffee beverages, for example, may be prominently displayed on a home page, while the other available beverages only have a small display or are shown on a second page. At lunchtime, the selection of soups, for example, may be displayed in a particularly prominent manner, and in the evening the selection of teas, for example, may be displayed.

A door is preferably provided on the self-service beverage vending machine to allow access to the beverage preparation module and, if necessary, one or more access modules, in particular an operating element such as a self-service operating element being pivotably provided so that the operating element remains usable even when the door is open. The door allows convenient access to the components situated in the self-service beverage vending machine, whereby, in particular due to the pivotable operating element, additional information such as the filling level of ingredient containers, operating temperatures, etc. remains displayable. This allows information to be provided to the service or operating personnel, and the quality and speed of the operations to be performed may be improved.

On the self-service beverage vending machine, the door preferably has a first closing device, and the beverage preparation module preferably has a second closing device. Although the operating personnel are able to refill ingredient containers, they would be overburdened in carrying out service operations. In contrast, the service personnel are able to carry out the refilling of ingredients as well as service operations. Access to the corresponding areas is controlled [by] the first and second closing devices. The closing devices may involve special tools, locks and keys, electronic code or badge locks, or other closing devices.

A cleaning security system is preferably provided on the self-service beverage vending machine, so that during automatic cleaning of device components, access to the device components being cleaned is prevented. The cleaning security system in particular protects the users of the self-service beverage vending machines from scalding by blocking access to components such as the outlet module by means of a safety door, or by swiveling the outflow module away during the cleaning.

The self-service beverage vending machine preferably includes an advertising software module for playing advertising on a display of the self-service beverage vending machine. The display may involve a display which is installed in an operating element of the self-service beverage vending machine, an auxiliary display which is installed in the housing of the self-service beverage vending machine, or some other display. The company operating the self-service beverage vending machine may generate additional revenue by playing advertising.

The self-service beverage vending machine preferably includes a watchdog software module for monitoring that the options for selecting a beverage are always displayed on a self-service operating element. This ensures that, for example, the display of an operating element is not blocked by the playing of advertising.

The self-service beverage vending machine preferably includes a reference software module for displaying additional information on a display during the preparation of a beverage. The additional information may involve, for example, the preparation time for tea which is prepared using teabags.

In addition to a beverage preparation module, an additional module, an outflow module, and a self-service beverage vending machine, the invention is directed to a computer program product. The computer program product contains program code for controlling one or more processors of a beverage preparation module and/or a self-service beverage vending machine, the computer program product controlling the following steps: Receiving beverage preparation parameters which are transmitted to a control unit via a communication interface, controlling a preparation device and water supplied to a water connection for preparing a beverage, and, if necessary, controlling additional modules for carrying out additional preparation steps. By use of such a computer program product, the preparation of a beverage may be flexibly controlled for a wide variety of different beverages.

The computer program product preferably also contains program code for a billing software module, in particular for communicating with a payment system via a billing interface. The billing is performed in particular according to the MDB standard, and payment for the prepared beverages is thus ensured by a widely used, reliable payment system.

The computer program product preferably also contains program code for a database software module, in particular for storing data and configurations in a database. Relevant data may be quickly stored and efficiently retrieved during operation.

The computer program product preferably also contains program code for a protocol module, in particular for initiating the preparation of a beverage based on a defined protocol between the beverage preparation module and an operating element. In particular, robust communication between the components of the self-service beverage vending machine is made possible by the defined protocol. Additional components which meet the protocol may be quickly and reliably incorporated. The protocol is not dependent on the technology used, such as the communication channels such as Ethernet, RS232, etc., the hardware used, such as a personal computer, touchpad, etc., or the operating systems used, such as Windows, Linux, etc.

The computer program product preferably also contains program code for a telemetry software module, in particular for monitoring and billing the preparation of beverages via a computer center for monitoring self-service beverage vending machines. In particular, efficient maintenance is made possible by the communication of the beverage preparation module and/or of the self-service beverage vending machine with a computer center for monitoring self-service beverage vending machines. Thus, in the event of malfunctions, the required operating or service personnel may be deployed very quickly, or attempts may be made from the computer center to eliminate the malfunction.

The computer program product preferably also contains program code for an expansion software module, in particular for providing the beverage preparation module and/or the self-service beverage vending machine with additional functionalities from external expansion modules. The use of external hardware modules and/or software modules for preparing beverages allows in particular further enhancement of performance and reliability.

The computer program product preferably also contains program code for a test software module, in particular for detecting an RFID code or a matrix code. Thus, the ingredient containers may have an RFID code or matrix code which is checked, and by means of which it may be determined whether a suitable or correct ingredient container is used. If an incorrect ingredient container is used, such as an ingredient container which is not authorized by the company operating a self-service beverage vending machine, beverages which are based on the ingredient in question may be blocked. In order to check whether a given additional module is even present at all, the test software module in particular is configured for carrying out a motor current measurement. If no motor current is measurable, it may be concluded that the ingredient module in question is not in use. Alternatively, an RFID code- and/or matrix code-based reading system may be provided which cooperates with the test software module, by means of which a check is made as to whether a given additional module is present, or alternatively, whether a similar additional module is available.

BRIEF DESCRIPTION OF THE DRAWINGS

The invention is explained below with reference to figures which merely represent exemplary embodiments. The figures show the following.

APPROACH(ES) FOR CARRYING OUT THE INVENTION

Figure 1:
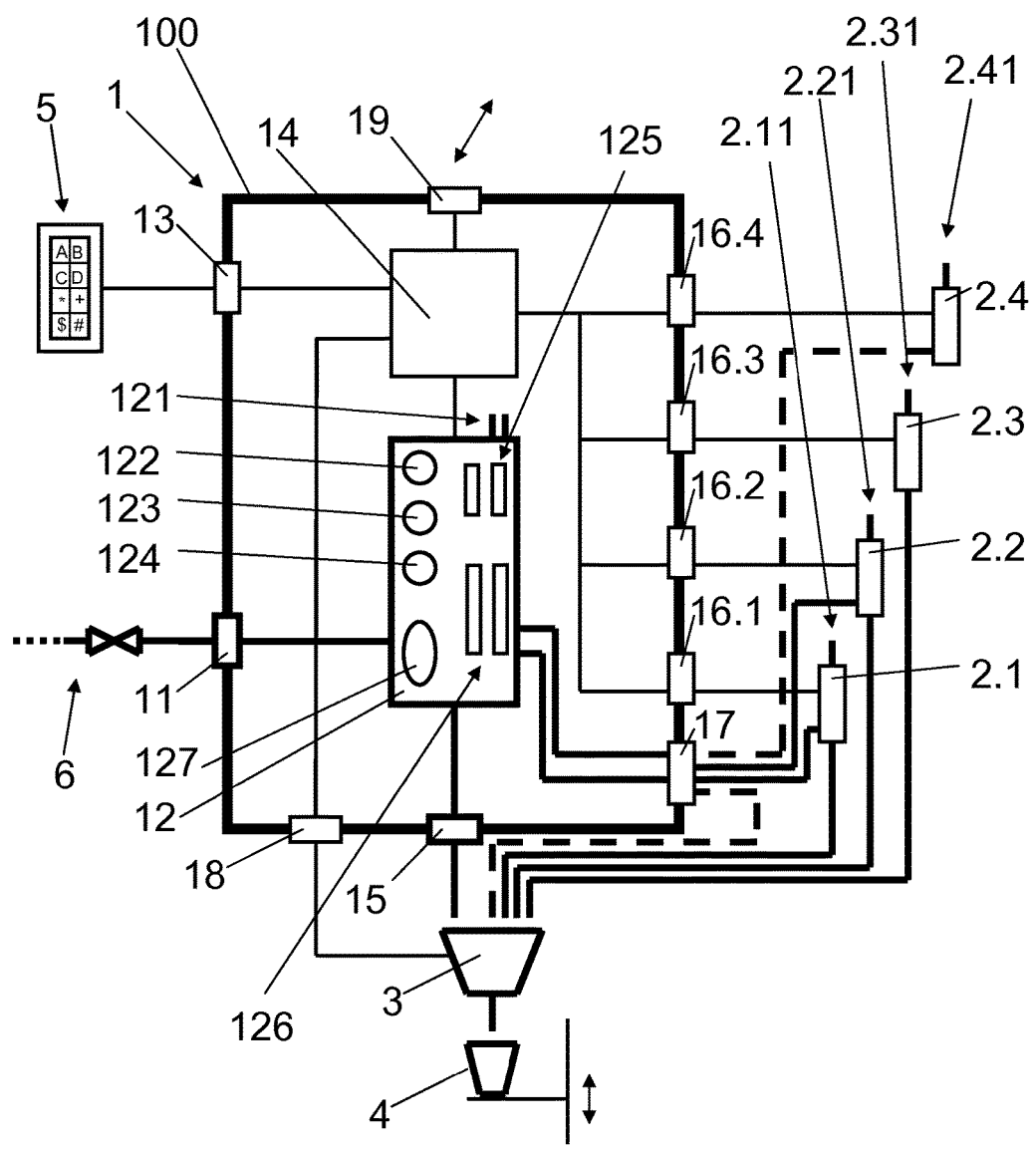
FIG. 1 schematically shows a beverage preparation module which is configured for installation in a self-service beverage vending machine.

FIG. 1 schematically shows one embodiment of a beverage preparation module 1 which is provided for installation in a self-service beverage vending machine. The beverage preparation module 1 includes a water connection 11 and a preparation device 12 for preparing a beverage using water which is supplied to the water connection 11. Water is provided, for example, via a water mains system which is connected to the water connection 11, a water container which is connected thereto, or in some other way. The beverage preparation device 12 includes devices for preparing beverages such as coffee, tea, hot chocolate, instant soup, etc. In one embodiment, the preparation device 12 includes a coffee vending machine for preparing high-quality coffee. The coffee vending machine includes, for example, one or more coffee brewing units 126 which have brewing chambers that are opened and closed by motor. Brewing units, such as those known, for example, from EP 2 036 466 or EP 2 030 538 by the present applicant, or from EP 0 528 758 are particularly preferred. With regard to the design and mode of operation of such a brewing unit, integral reference is made to the above-referenced patent applications. The reliability and ease of maintenance of this brewing unit is particularly advantageous with respect to the present requirements. The one or multiple coffee brewing unit(s) is/are configured for preparing a high-quality coffee beverage after the brewing chambers are filled with freshly prepared powdered coffee and supplying hot water, and dispensing the coffee beverage during or after the preparation. In the case of multiple coffee brewing units 126, the dispensed coffee beverages may be individually further processed, or may be mixed only prior to the further processing. In addition, the coffee vending machine includes one or more coffee grinders 125 which may be supplied with coffee beans from one or more bean hoppers 121. In particular, multiple bean hoppers 121 are provided for different coffee bean qualities, such as one coffee bean quality for preparing an espresso, another coffee bean quality for preparing a lungo, and so forth. The coffee vending machine has, for example, a coffee boiler 122 and a water pump 127, hot water being provided in the coffee boiler 122 in particular at a pressure of up to 8 bar and a temperature of greater than 100° C., for example. In one embodiment, the coffee vending machine has a hot water boiler 123 in which hot water is provided, or possibly a steam boiler 124 for generating hot steam. The one or multiple coffee brewing unit(s) is/are configured for ejecting the coffee grounds puck from the brewing chambers after a coffee beverage is prepared. The beverage preparation module has a coffee grounds ejector for delivering the coffee grounds puck to a grounds container.

The preparation device 12 has at least one preparation interface which is configured for connecting electrical control signals for controlling the preparation of a beverage. In one embodiment variant, the preparation interface is configured for receiving control signals for the preparation of coffee beverages, such as control signals for grinding coffee beans, present in a coffee [bean] hopper, using a coffee grinder, opening the brewing chamber of the brewing unit, filling a portion of ground coffee into the brewing chamber of the brewing unit, closing the brewing chamber of the brewing unit, supplying hot water from the coffee boiler, and ejecting the coffee grounds from the brewing chamber after the coffee is prepared.

The beverage preparation module 1 includes at least one communication interface 13 and a control device 14 to which beverage preparation parameters are transmittable via the communication interface 13. The control device 14 is configured for controlling the preparation device 12 via the above-described preparation interface, so that a beverage is prepared based on the beverage preparation parameters. The control signals required for controlling the preparation device 12 are thus generated by the control device 14 corresponding to the beverage preparation parameters, and transmitted to the preparation device 12. In one preferred embodiment variant, the control device 14 includes a regulator in order to additionally carry out regulation instead of only control during the preparation of the beverage; i.e., preparation parameters such as temperature, pressure, and ingredient quantities are detected via sensors, the measured preparation parameters being evaluated and appropriately adapted control signals being generated. Thus, for example, the temperature of a coffee boiler 122 is regulated by a heating unit, a rotational speed of a water pump 127 is regulated, or a quantity of powdered coffee filled into a brewing unit 126 is set. Likewise, when milk/cappuccino units are present, the supply of steam and/or milk may be regulated by means of the control device 14.

In one embodiment variant, the beverage preparation module 1 is situated in a module housing 100, in particular in a stable, high-quality module housing 100 made of aluminum, for example, or some other material. The module housing 100 may in particular be opened from the front. In one embodiment variant, the module housing 100 has a slot for cleaning tablets. In one embodiment, the module housing 100 also has a coffee grounds ejector in order to dispose of the coffee grounds puck, present after the preparation of coffee beverages, in a waste container situated beneath the beverage preparation module 1, for example. The coffee grounds ejector may be secured, for example by mechanical, electrical, or other means, against inadvertent contact by the hand. The coffee grounds ejector has a sufficient downward slope so that the coffee grounds puck may be introduced into the waste container without additional mechanical assistance. To further assist with this disposal, in one embodiment variant the coffee grounds ejector may have an inner coating, such as chrome plating, which prevents undesirable microbial contamination of this component. In addition, a cleaning device may be provided by means of which the coffee grounds ejector may be cleaned as needed, or after a time interval. In one embodiment variant, the cleaning device includes mechanical devices, such as a scraper or a cleaning wiper, which are used to mechanically clean the surfaces of the coffee grounds ejector. In another embodiment variant, the cleaning device includes a dispenser for liquid or powdered cleaning agents. The cleaning device may also have nozzles or outlets for carrying out water- or steam-based flushing or cleaning.

Maintenance activities must be carried out during operation of the beverage preparation module 1. At this point it is mentioned that the term "service personnel" refers to persons who conduct fairly complex, technically skilled operations such as the repair, adjustment, or replacement of complicated modules. On the other hand, the term "operating personnel" refers to persons who conduct simpler, routine operations such as refilling ingredients, exchanging ingredient containers, or simple cleaning activities.

In one embodiment, the module housing 100 of the beverage preparation module 1 may be opened only using a special tool or after entering a security code, for example by the service personnel, the special tool or the security code ensuring that, for example, the operating personnel cannot open, or can only partially open, the module housing 100. The module housing 100 may have a sealed design, for example to satisfy overflow testing. For subdividing the interior of the module housing 100, partition walls may be provided, in particular so that water-conducting parts, brewing chambers, and electrical and electronic devices are separated from one another. In addition, in particular bean hoppers and coffee grinders are thermally separated from the coffee boiler. For cleaning the brewing chamber of the brewing device or for replacing the brewing device, access may be provided which is available to operating personnel without additional tools, whereby electrical devices in particular are monitored and switched off via a safety switch while the area is being accessed.

In one embodiment variant, the beverage preparation module 1 has an operating element. The operating element is mounted on the module housing 100, for example, and is configured in particular for making settings on the control unit 14 and displaying current or stored settings. The settings may involve, for example, the parameters necessary for preparing beverages, such as brewing temperature, brewing time, brewing pressure, etc. The operating element may be configured for displaying current settings or data in particular of the control unit 14 or any other device of the beverage preparation module 1, such as the number of beverages prepared, optionally itemized by the type of beverage, filling level information, cleaning information, repair information, etc. The operating element may have a display, for example a 4.3-inch display, a 5.7-inch display, or a display having some other size. In one embodiment variant, the display is designed as a touchscreen, for example as a resistive or capacitive touchscreen display. In one embodiment, the control unit 14 is contained in the operating element.

In another embodiment variant, the control unit 14, the operating element, or some other component of the beverage preparation module 1 has one or more computer processors which is/are configured for running on an operating system such as WinCE in particular. The functional modules described in the present document are designed in particular as programmed software modules which control one or more processors and peripheral units connected thereto in order to carry out functions such as control functions, display functions, setting functions, data transmission functions, etc. The programmed software modules are stored on a computer-readable medium which is connectable to the one or more processors, so that the programmed software modules are able to run on one or more processors. However, those skilled in the art are aware that the functional modules may be partially or completely implemented in hardware or as so-called embedded systems.

In one embodiment, the beverage preparation module 1 has a power section with various I/O interfaces and an architecture known in coffee vending machines. In another embodiment variant, a power supply is provided which is connectable to any single- or multi-phase power supply, for example to a 230-V or 120-V power grid, and which provides a supply voltage of in particular 24 V or 30 V. In particular solid state relays (SSRs) are provided for connecting consumers, whereby preferably multiple channels are connectable, for example four heating channels for a boiler and one channel for a pump. In another embodiment variant, a water pump 127, in particular a rotary pump, is attached by means of which the water which is supplied to the water connection may be conveyed, in particular into a coffee boiler 122, a hot water boiler 123, and/or a steam boiler 124. In one embodiment, these boilers have a power of 2 kW, 3 kW, or 6 kW, and a volume of 0.8 liter to 1.2 liter, for example. In the coffee boiler 122 the water may be heated under a pressure of up to 8 bar, for example, the water pump 127 being appropriately configured for generating such a pressure. The coffee boiler 122 preferably has a pressure relief valve which is activated at a pressure of 12 bar, for example, to avoid a further increase in pressure. The boilers may be configured for quick exchangeability for maintenance purposes. For controlling the water flow, various valves are preferably provided which are mounted in an interlinked manner or individually. The fluid system between the water connection 11, the water pump 127, and the boilers 122, 123, 124, for example, is preferably designed with quick connectors and plug-in valves. Safety valves are situated to allow easy replacement. In one embodiment variant, a main valve is provided, the water flow as well as the valve settings being monitored by sensors and evaluated by a monitoring device. The monitoring device includes a programmed software module, for example, and is configured for switching off the main valve in the event of discrepancies in the water flow. Such a discrepancy may exist if water flows without a corresponding valve being open. In one embodiment, the water flow is monitored with one or more flow meters which in particular contain(s) a water wheel and a Hall sensor. In particular, the entire fluid system is monitored with multiple flow meters.

For preparing freshly ground powdered coffee, in one embodiment the beverage preparation module 1 has one or more coffee grinders 125 which are each connectable to a bean hopper 121. In one embodiment, the filling level of the bean hoppers is visually or electrically monitored, in particular the current consumption of the coffee grinders 125 during grinding of fresh powdered coffee being used for electrical monitoring. Visual monitoring is preferred, since it may thus be determined whether the filling level of the coffee [bean] hoppers is adequate to still prepare one or more complete portions of freshly ground powdered coffee. In contrast, in the monitoring of the electrical current consumption it can only be determined that at a certain point in time the powdered coffee is depleted. Thus, in electrical monitoring it is not ensured that a complete portion of freshly ground powdered coffee can be prepared. This is disadvantageous for use in a vending machine, since the purchase of a complete beverage is not ensured. For hand-operated devices this is less problematic, since the operating personnel may easily prepare a new beverage after filling with the coffee beans. The bean hoppers are preferably situated on the beverage preparation module 1 so that they are externally accessible and easy to remove or replace, in particular by the operating personnel. The bean hoppers preferably have a capacity of at least 2 kg of coffee beans, and in particular are passively ventilated so as not to impair the quality of the coffee beans stored therein. In one embodiment variant the coffee [bean] hoppers may have a transparent design so that the beans are visible from the outside in order to emphasize the high quality of the prepared beverage.

In one embodiment variant, the beverage preparation module 1 has a coffee brewer having a brew head with a capacity of 14 g, 20 g, or 30 g of fresh powdered coffee. In one alternative embodiment, the brew head is configured for a smaller or larger capacity. The coffee brewer may in particular be designed as a plastic coffee brewer which is easily replaceable without tools.

In one embodiment, the beverage preparation module 1 has one or more interfaces for data transmission, such as an Ethernet interface, a multidrop bus (MDB) interface, or a Universal Serial Bus (USB) interface. In one embodiment, a separate graphical user interface (GUI) is connectable via Ethernet, whereby, depending on the architecture, direct access to a control application of the control device 14, for example, is made possible via a socket connection, for example. The USB interface allows, for example, a connection of wireless communication modules such as Infrared Data Association (IrdA), Wireless Local Area Network (WLAN), Global System for Mobile Communication/Universal Mobile Telecommunications System (GSM/UMTS), Bluetooth, or some other wireless communication module. The interfaces for the data transmission may also be based on an RS-485 standard.

In one embodiment, alarm interfaces, status interfaces, power supply line interfaces, and/or supply voltage interfaces are provided on the beverage preparation module 1. The status in a local environment may be made visually or acoustically discernible via alarm interfaces, for example by using sirens or flashing lights, on a display of a cash register, for example, of a sales area associated with a self-service beverage vending machine, or in some other manner. The presence or the filling level of a grounds container, for example, may be monitored via status interfaces. A power supply such as a single-phase or three-phase power supply may be ensured on a country-specific basis via supply voltage interfaces.

In another embodiment variant, the beverage preparation module 1 has one or more fluid interfaces, in particular a beverage outlet 15 and an additional fluid interface 17 for a hot water connection, a steam connection, and a flush water connection, which are provided, for example, for a connection with one or more milk modules 2.1, with one or more powder modules 2.2, with one or more cleaning modules 2.4, and for an outflow module 3.

FIG. 1 schematically illustrates a beverage outlet 15 which is configured for dispensing the beverage which is prepared by the beverage preparation module 1 for further use.

Additional module interfaces 16.1, 16.2, 16.3, 16.4 are schematically illustrated in FIG. 1. The additional module interfaces may in particular be configured for ensuring data communication between the control unit 14 and additional modules such as in particular one or more milk modules 2.1, one or more powder modules 2.2, one or more syrup modules, and one or more cleaning modules 2.4. As schematically illustrated in FIG. 1, the milk module 2.1, the powder module 2.2, the syrup module 2.3, and the cleaning module 2.4 have corresponding ingredient containers 2.11, 2.21, 2.31, 2.41, respectively. The additional module interfaces 16.1, 16.2, 16.3, 16.4 have in particular power supply interfaces for supplying power to the additional modules. In one embodiment, the supply of power is ensured by a power supply situated in the beverage preparation module 1.

FIG. 1 schematically illustrates additional fluid interfaces 17 which in particular are configured for providing a fluid connection between the preparation device 12 and one or more additional modules, in particular the milk module 2.1, the powder module 2.2, and the cleaning module 2.4. For example, water, hot water, steam, or cleaning fluid may be exchanged between the beverage preparation module 1 and the additional modules via the additional fluid interfaces 17.

FIG. 1 illustrates a self-service operating element 5 which, as mentioned, is designed as an operating element of the beverage preparation module 1, as a GUI, as a tablet computer having a touchscreen, or in some other way. In particular beverage preparation parameters may be established, and the preparation of a beverage initiated, via the self-service operating element 5. The self-service operating element 5 may also include a payment system which is based on coins, cards, or other means of payment. As illustrated in FIG. 1, the self-service operating element 5 is connected to the communication interface 13. In preferred embodiments, an approach using a smart phone or some other portable user device may also be used as a payment system, the payment being processed via a control center, or, in the case of a prepaid system, for example, processed locally.

FIG. 1 illustrates a water supply 6 which is based, for example, on a water mains system, a water container, or some other water supply. The water supply 6 is connected to the water connection 11, thus providing the beverage preparation module 1 with water in desired quantities.

FIG. 1 illustrates an outflow module 3 which collects various fluid streams, such as a prepared beverage, from the beverage outlet 15, and additives or beverages which are dispensed by a milk module 2.1, a powder module 2.2, a syrup module 2.3, a cleaning module 2.4, or some other module. The outflow module 3 is configured for collecting these beverages and/or additives and dispensing them into a cup 4. As schematically illustrated in FIG. 1, the outflow module 3 may be stationarily mounted, and the cup 4 may be situated on a holder so as to be vertically displaceable, so that the distance between the outflow module 3 and the cup 4 during the beverage preparation and removal of the cup 4 is adjustable as needed. As is apparent from FIG. 1, in one embodiment variant the beverage preparation module 1 has an outflow module interface 18 via which in particular a control connection may be established between the control unit 14 and the outflow module 3.

In another embodiment variant, the beverage preparation module 1 has a monitoring interface 19 via which in particular a data connection to remote monitoring devices such as a personal computer, a monitoring server, or some other monitoring device is made possible.

Figure 2:
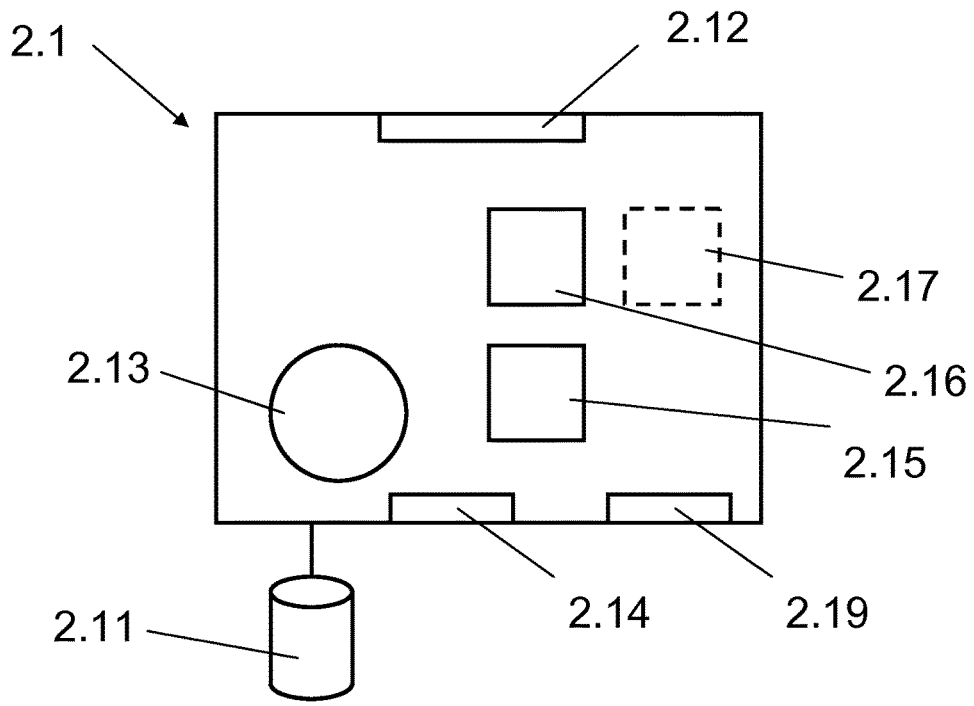
FIG. 2 schematically illustrates a milk module which is configured for connection to the beverage preparation module.

FIG. 2 shows one embodiment of a milk module 2.1 which is provided for connection to the beverage preparation module 1. The most important ingredients of the milk module 2.1, i.e., the fresh milk, are provided in a milk container 2.11, which in one embodiment is separate from the milk module 2.1. The milk module 2.1 has in particular one or more of the following components: a milk module interface 2.12 for connection to the beverage preparation module 1, a milk pump 2.13 for conveying milk from the milk container 2.11, a milk filling level monitor 2.14 for monitoring the filling level of the milk container 2.11, a pinch valve 2.15, an air pump 2.16, and a flush valve 2.17. The milk pump 2.13 is in particular situated in an easily accessible location. The pinch valve 2.15 is used in particular for switching between the pumping of milk and the flushing of the milk module 2.1. The air pump 2.16 allows in particular the production of cold milk foam, whereby air is introduced into the milk, and the milk foam is produced via nozzles in the milk path. The flush valve 2.17 may have a multiple design, for example, whereby only one hot water connection is necessary on the beverage preparation module side. The milk filling level monitoring 2.14 may take place in particular using an ultrasonic sensor, or an inductive sensor mounted on the milk container 2.11. The milk module interface 2.12 is configured in particular for transmitting control signals, for transmitting electrical energy for supplying power, and/or for transmitting fluids such as water, hot water, steam, or cleaning agent between the beverage preparation module 1 and the milk module 2.1. Lastly, the milk module 2.1 has a milk outlet 2.19 for conveying prepared milk to the outflow module 3.

Figure 3:
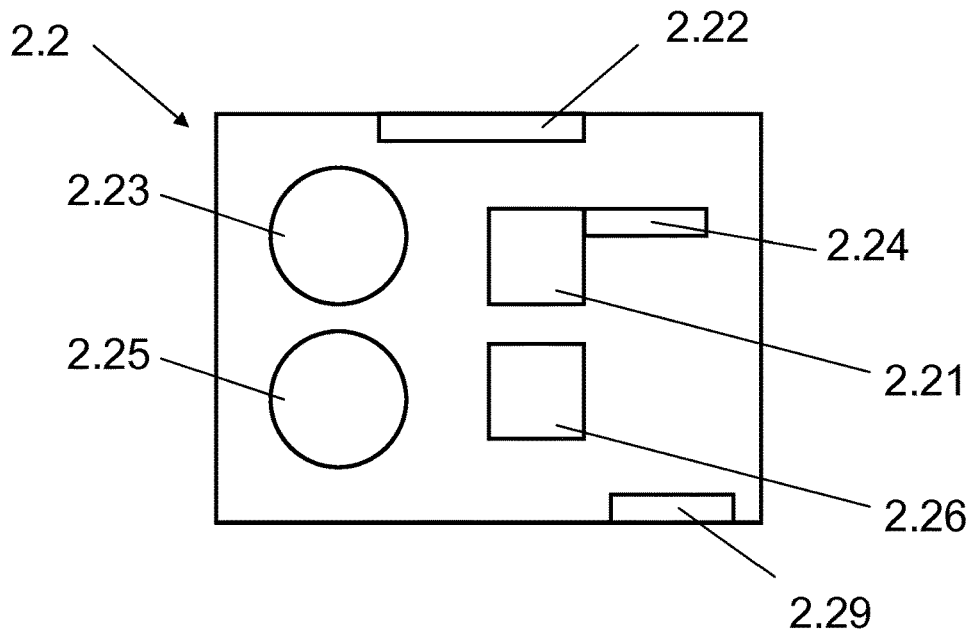
FIG. 3 schematically illustrates a powder module which is configured for connection to the beverage preparation module.

FIG. 3 shows one embodiment of a powder module 2.2 which is provided for connection to the beverage preparation module 1. The most important ingredients of the powder module 2.2, i.e., in particular a powder for preparing a given beverage, are provided in a powder container 2.21, which in one embodiment is situated in the powder module 2.2. The powder module 2.2 has in particular one or more of the following components: a powder module interface 2.22 for connection to the beverage preparation module 1, a conveying device 2.23 for conveying powder from a powder container 2.21, a powder filling level monitor 2.24 for monitoring the filling level of the powder container 2.21, a mixer 2.25 for mixing powder with water, and a water valve 2.26. The conveying device 2.23 has in particular a conveyor motor and a screw conveyor for conveying a given quantity of powder into the mixer 2.25. The mixer 2.25 has a mixer motor and mixing devices, it being ensured in particular that an overflow of the mixer may flow out in a controlled manner. The powder container 2.21 has a capacity of 4 liters, for example. The powder filling level monitoring 2.24 may take place via ultrasound or in an inductive manner. The powdered beverage outlet 2.29 is configured for conveying the beverage which is prepared with powder.

Figure 4:
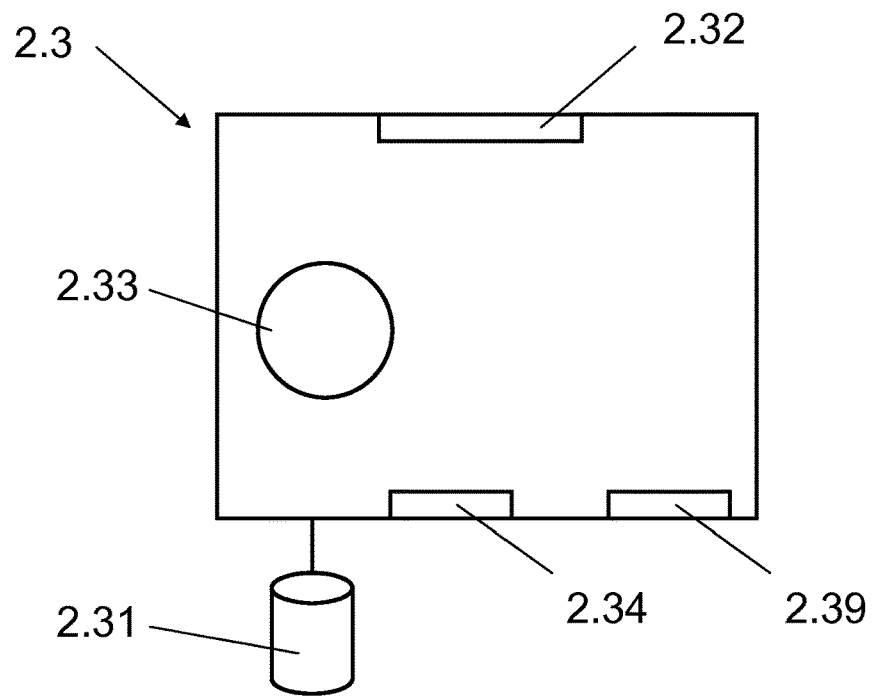
FIG. 4 schematically illustrates a syrup module which is configured for connection to the beverage preparation module.

FIG. 4 shows one embodiment of a syrup module 2.3 which is provided for connection to the beverage preparation module 1. The most important ingredients of the syrup module 2.3, i.e., in particular a syrup having a certain flavor, are provided in a syrup container 2.31, which in one embodiment is separate from the syrup module 2.3. The syrup module 2.3 has in particular one or more of the following components: a syrup module interface 2.32 for connection to the beverage preparation module 1, a syrup pump 2.33 for conveying syrup from the syrup container 2.31, and a syrup filling level monitor 2.34 for monitoring the filling level of the syrup container 2.31. The syrup pump 2.33 is designed in particular as a peristaltic pump. In one embodiment, the syrup interface 2.32 is configured, the same as other additional module interfaces, for example, for receiving a signal, such as a pulse width modulation (PWM) signal, for activating the syrup pump 2.33, and for transmitting a signal concerning the filling level of the syrup container 2.31. In one embodiment variant, electrical power for operating the syrup module 2.3 is transmitted via the syrup interface 2.32. The syrup filling level monitor 2.34 has a sensor, which in one embodiment is mounted on the syrup container 2.31. Lastly, the syrup module 2.3 has a syrup outlet 2.39 for conveying syrup to the outflow module 3.

In one embodiment, the beverage preparation module 1 and, if necessary, the additional modules 2.1, 2.2, 2.3, 2.4, have redundant modules. In this case, the beverage preparation module 1 preferably has multiple coffee brewing units whereby, among other situations, in the event of a malfunction of an individual coffee brewing unit it is ensured that other coffee brewing units are able to completely take over the functions necessary for preparing the beverage. The additional modules 2.1, 2.2, 2.3, 2.4 may likewise have multiple redundant units. At the same time, it thus possible to achieve increased power and/or shorter preparation times by connecting these redundant units in parallel, in particular for an individual outlet of two brewing units. Alternatively, in preferred embodiments, likewise for corresponding improvement, multiple beverage preparation modules 1 and/ or multiple additional modules 2.1, 2.2, 2.3, 2.4 of the same type are provided, i.e., multiple syrup modules, powder modules, milk modules, etc.

In particular when the monitoring interface 19 is used, in one embodiment it is provided to transfer, i.e., transmit and receive, telemetry data between the beverage preparation module 1 and a central unit, for example. The telemetry data may in particular involve filling level, functionality, or quantity information concerning prepared beverages. The telemetry data may be evaluated or monitored in the central unit, so that maintenance of the beverage preparation module and the additional modules connected thereto may be performed as needed; i.e., as soon as an ingredient container is empty or a malfunction is detected, service personnel or operating personnel may be appropriately deployed. In another embodiment, visual and/or acoustic alarm signals are locally generated at the beverage preparation module 1, whereby, depending on the malfunction, only a local alarm, only an alarm via the control center, or a combination of a local alarm and an alarm via the control center takes place. In one embodiment variant, the telemetry data involve beverage recipes, so that new recipes may be loaded on the beverage preparation module, or recipes which are no longer current may be deleted or blocked. In another embodiment variant, the telemetry data involve operating data in order to allow operation or assistance from a central unit, for example for training purposes, or for customers who have difficulty operating vending machines, such as visually impaired customers. The telemetry data necessary for operation may be generated, for example, on a mobile device such as a smart phone, so that operation is made possible via a mobile wireless network, for example to make targeted queries concerning the status of the beverage preparation module 1, or to initiate the preparation of a beverage after a payment center contained in the mobile network has confirmed the billing of an amount of money. A query of the status may involve the filling level of ingredients, for example, so that the operating personnel, who, although they are in the vicinity, are not at the location of the beverage preparation module 1, may decide whether it is worthwhile to immediately go to the location of the beverage preparation module 1 in order to perform appropriate refilling or cleaning operations, in case this would be necessary anyway in the foreseeable future.

The beverage preparation module 1 is preferably configured for carrying out automatic cleaning as needed in cooperation with a cleaning module 2.4. For this purpose, a cleaning software module, for example, is provided which cooperates with one or more sensors, for example, to decide, based on a degree of soiling ascertained by the sensors, whether there is a need for cleaning. In addition, the cleaning software module is configured for carrying out the cleaning in particular after a given time interval has elapsed, or after preparation of a given number of beverages. If the cleaning software module determines that cleaning is necessary, appropriate information is transmitted, in particular via the communication interface 13 and/or the monitoring interface 19, to, for example, the self-service beverage vending machine in which the beverage preparation module 1 is installed, or to a control center. The self-service beverage vending machine is configured, for example, for initiating measures during a cleaning, for example closing a dispensing area to prevent a user from being accidentally scalded, or a depiction on a display that the device is being cleaned. The closing of the dispensing area is preferably carried out using a flap door or by swiveling the dispensing area away. In one embodiment, the self-service beverage vending machine activates one or more waste containers for receiving used cleaning fluid or cleaning agents.

In one embodiment variant, the beverage preparation module 1 has a coordination software module. The coordination software module is configured in particular, in particular in cooperation with interfaces or sensors, for collecting and evaluating coordination data such as the number and the type of additional modules connected to the beverage preparation module 1, the status of a beverage preparation device, the filling level of ingredients, the temperature and the pressure of hot water containers, and other coordination data. The evaluation is carried out in particular in such a way that a determination is regularly made concerning which beverages, in which quantities, can still be prepared. In one embodiment, the coordination software module is configured for transmitting evaluation results in cooperation with the communication interface 13 and/or the monitoring interface 19, so that, for example, an operating element, for example, which is connected to a beverage vending machine in which the beverage preparation module 1 is installed, may automatically adjust to the beverage selection that is available at that moment. If, for example, a syrup container is empty, it may then be ensured by a software module of the operating element, for example, that the selection of beverages on which this syrup is based is blocked for the user, or is no longer displayed to the user at all. In addition, a notification for maintenance may be transmitted via the monitoring interface, so that the syrup container may be replaced as needed by the service personnel.

In another embodiment, the beverage preparation module 1 has function test software. In one embodiment, the function test software is configured for testing, in cooperation with operating software which is executable in an operating element that is installed on a beverage vending machine, which functions are to be performed by the beverage preparation module 1, and which functions are to be performed by the software of the operating element. The operating element may include a powerful Linux or Windows computer, for example. In this case, the function test software may be used to determine that, for example, the monitoring or control of the beverage preparation module 1 is provided by the operating element, whereby safety-relevant functions, for example, are always left in the beverage preparation module 1 or are double-checked. In another case, the operating element may have only a simple keypad. In this case, the function test software may be used to determine that, for example, all tasks such as monitoring and control of the beverage software module 1 are carried out completely by software modules which are executable in the beverage preparation module 1.

In yet another embodiment, the beverage preparation module 1 has a billing software component, such as an MDB software component, which ensures the billing of prepared beverages. In one embodiment variant, the billing may take place in cooperation with a payment system which is installed on the beverage vending machine. In another embodiment variant, the billing takes place, for example, in cooperation with the monitoring interface and a remote central payment system.

In one embodiment, an assistance software module is provided which is configured for regularly detecting the filling level of the ingredients and the consumption of the ingredients. The assistance software module is activated upon the first refilling of ingredients, for example via sensors which monitor the refilling of ingredients. If other ingredients likewise have a low filling level, the assistance software module generates an appropriate message which appears on a display, for example on the display of the operating element of the beverage preparation module 1, on the display of the beverage vending machine, on the display of a mobile device, or on some other display. The assistance software module may additionally include a projection module which determines, based on the filling level of ingredient containers and the expected future consumption determined in the past, time information concerning when the exchange of a particular ingredient container is to be expected. The operating personnel may thus decide whether it is worthwhile to immediately replace an ingredient container which is only partially empty, or whether the replacement may be postponed to a later time.

In one embodiment, an equipment module is provided which is configured for regularly detecting the consumption and the refilling of ingredients. The favorite ingredients at a location cannot be easily established in advance. Thus, at a location that is frequented by a large number of students, for example, the consumption of ingredients may vary depending on the current taste preferences of the students, for example due to recent advertising campaigns. The equipment module is configured for determining the optimal quantity of ingredients at a particular location based on values from the past, and during refilling of ingredients to notify the operating personnel on a display that, for example, a 2-liter package of a given syrup is to be used instead of a 1-liter package. It is provided that the equipment module transmits data concerning the consumption of ingredients to a control center which, based on the transmitted data, determines whether ingredient modules should be exchanged or supplemented, whereupon service personnel or operating personnel may be correspondingly deployed to make appropriate changes at self-service beverage vending machines.

Figure 5:
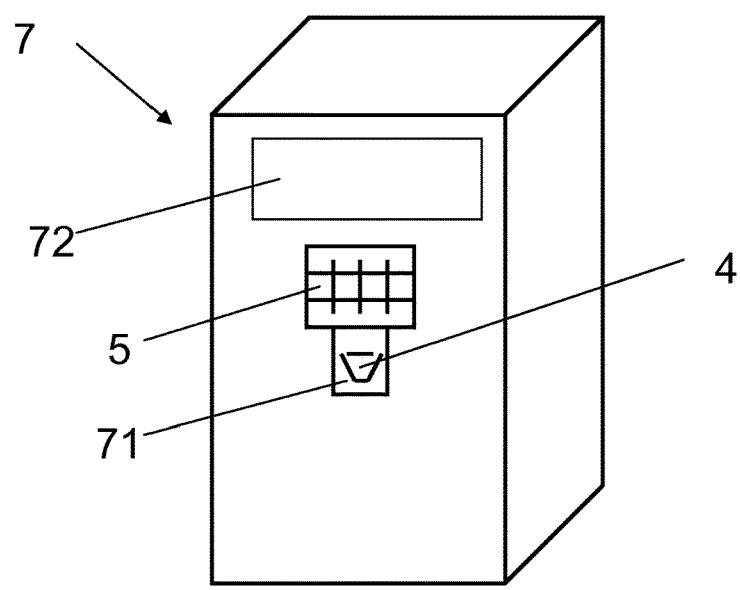
FIG. 5 schematically illustrates a closed self-service beverage vending machine.

FIG. 5 shows a closed self-service beverage vending machine 7 which has a self-service operating element 5 and a self-service dispensing area 71, in particular for a cup 4 in which a prepared beverage is provided. Depending on the location, i.e., which in particular is safe from vandalism, the self-service beverage vending machine 7 is designed with a particularly large number of auxiliary utensils such as cups, napkins, stir sticks, etc., or in a particularly eye-catching manner in order to use advertising displays to best advantage. The modules situated in the self-service beverage vending machine 7 are generally not visible from the outside, whereby special module parts such as a transparent coffee [bean] hopper are visible to emphasize the high quality of the prepared beverages. As is apparent from FIG. 5, a housing face 72 is visible above the self-service operating element 5. This housing face 72 may be used for advertising displays. In particular embodiments, a second display may preferably be used here which is likewise controlled by the computer unit of the self-service operating element 5. In this way, additional information or advertising may be displayed without interruption during operation by the user of the self-service beverage vending machine 7. In addition, this display may show large-scale information, which is also noticeable from a distance, during the standby time of the vending machine. During operation, this information, depending on the desired control, may be set to a different zoom factor so that the user may continuously observe the information.

Figure 6:
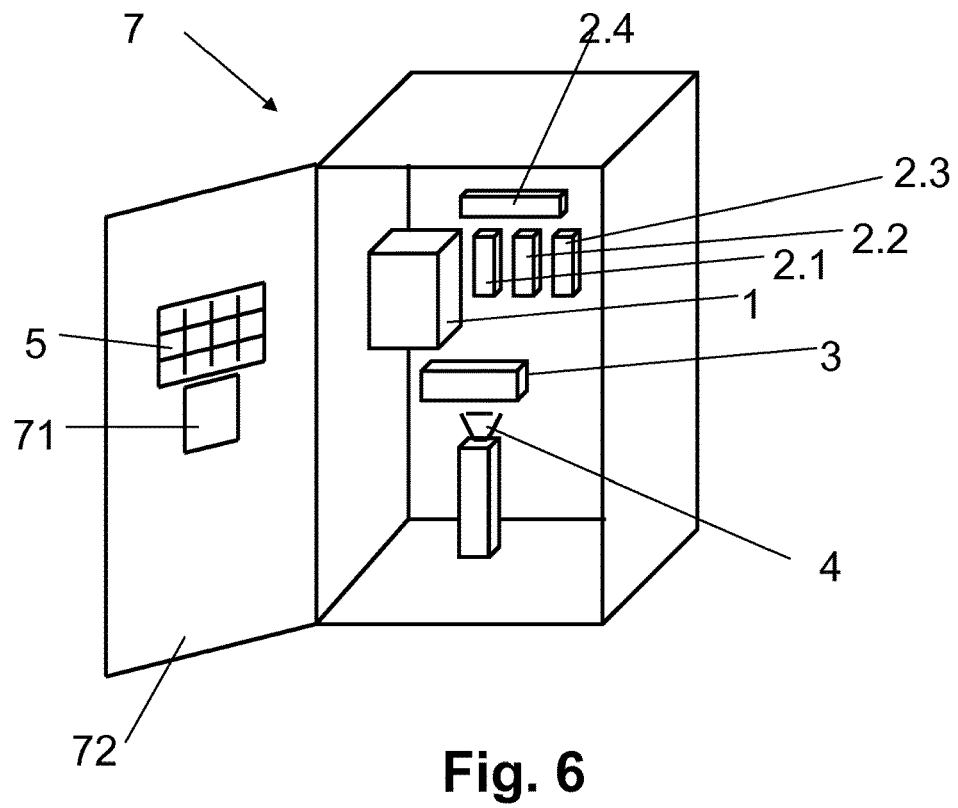
FIG. 6 schematically illustrates an open self-service beverage vending machine.

FIG. 6 shows an open self-service beverage vending machine 7 which has a door 73 which in particular may be opened both by operating personnel and service personnel. The self-service operating element 5 may be pivotably mounted on the door, so that the display of the self-service operating element 5 may be read even when the door 73 is open. When the door 73 is open, the beverage preparation module 1 situated in the self-service beverage vending machine 7, as well as the additional modules 2.1, 2.2, 2.3, 2.4 and the outflow module 3, are accessible. The beverage preparation module 1 is in particular completely accessible only by the service personnel, so that more complex operations cannot be performed by less trained operating personnel. For this purpose, the door 73 and the beverage preparation module 1 have two independent closing systems. In contrast, in particular the ingredient containers of the additional modules 2.1, 2.2, 2.3, 2.4 are accessible to the operating personnel, so that they may refill the ingredient containers as needed with milk, powder, syrups, and cleaning agent. Likewise, any coffee [bean] hoppers on the beverage preparation module 1 are provided for exchange or refilling by the operating personnel. As schematically illustrated in FIG. 6, the cup 4 is situated on a device which ensures the correct distance between the cup 4 and the outflow module 3, in particular which allows vertical adjustment of the cup 4. For mounting the beverage preparation module 1 and the additional modules 2.1, 2.2, 2.3, 2.4, in particular suspension devices such as screws are provided for engaging with corresponding grooves in the beverage preparation module 1 and the additional modules 2.1, 2.2, 2.3, 2.4.

The beverage preparation module and the additional modules are designed according to a master/slave concept. The master is formed by the beverage preparation module 1, to which the additional modules are connected as slaves. The master/slave concept extends not only to the control and the control lines of the slaves by the master, but also to supplying the slaves with electrical power, and, depending on the type of slave or the additional module in question, the slave is supplied with cold water, hot water, or steam. The control lines and other lines between the master and the slaves in particular have a star-shaped design; i.e., each slave is connected to the master via a control line, and additional lines are connected as needed. This is in contrast to a bus system, in which the master and the slaves would be connected to a shared line bus. In one embodiment, a higher-level master is provided, in particular a self-service operating element which cooperates with the master described here.

In one embodiment variant, the self-service operating element 5 includes an advertising software module in order to play or show advertising, which is stored on a local data memory or a data memory in a computer center, via the display or auxiliary displays. The advertising may be played, for example, when the self-service beverage vending machine 7 is not in use. In one embodiment variant, a monitoring module is provided which ensures that operating elements for operating the self-service beverage vending machine 7 are immediately displayed when a user approaches the vending machine, in particular a proximity sensor being provided. In one embodiment variant, portions of the display or one of multiple displays is/are reserved for displaying at least one start button via which a user may start operation of the vending machine. Alternatively, the start button as a hardware switch may be situated, for example, next to the self-service operating element 5 and appropriately labeled. In addition, in one embodiment a watchdog software module may be provided which monitors the self-service operating element 5 to ensure that at least one start button is present at any time on a display of the self-service operating element 5 for starting the process for purchasing a beverage. In one embodiment variant, the watchdog function is monitored or performed by a control center.

In one embodiment, a reference software module is provided for showing the user additional information on a display of the self-service operating element 5 during preparation of the beverage, such as advertising, information about the beverage, etc. The reference software module is configured, for example, in particular for making a query on the beverage preparation module 1 concerning the expected preparation time. The information shown on the display is selected in particular corresponding to this expected preparation time, which is calculated or looked up in the beverage preparation module 1, for example. Thus, for a long preparation time for a cappuccino, for example, longer advertising may be displayed, and for a short preparation time, such as for hot water for tea, information on the optimal brewing time of various teabags may be displayed.

Figure 7:
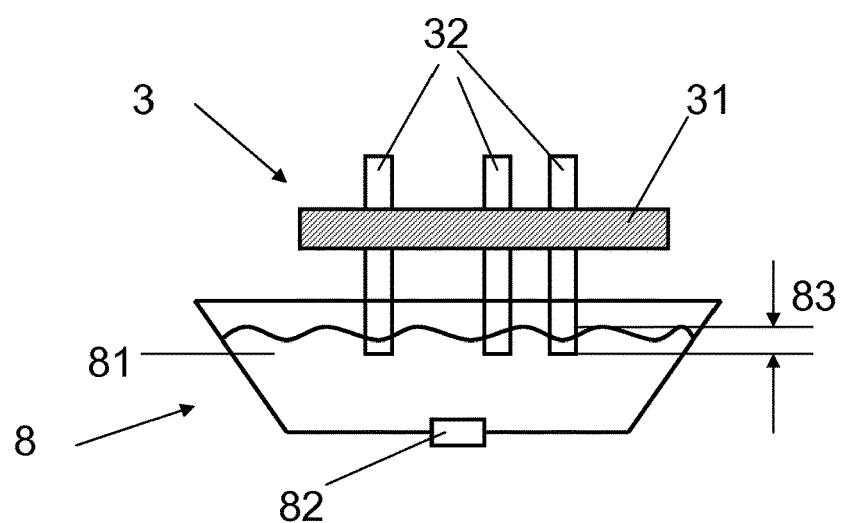
FIG. 7 schematically shows a cleaning step.

FIG. 7 schematically shows a cleaning step. In one embodiment, the outflow 3 includes a holder 31 for hoses 32. During a cleaning step, a cleaning basin 8 as schematically illustrated in FIG. 7 is situated at a distance from the holder 31, by either moving the holder 31 above the cleaning basin 8 or moving the cleaning basin 8 beneath the holder 31. The cleaning basin is filled, for example, with cleaning fluid contained in a cleaning module of an additional module 2.1, 2.2, 2.3, 2.4, and with hot water contained in the beverage preparation module 1. A filling level is set which submerges the hoses 31 into the cleaning fluid 81 at a submersion depth 83. The hoses 31 are left in the cleaning fluid 81 for a certain period of time or agitated therein. The cleaning basin is emptied via the outlet opening 82, and is subsequently flushed only with cold or hot water, for example, which is conducted into the cleaning basin. In an alternative embodiment variant, the emptying takes place by overflow of the cleaning fluid, tilting, or suctioning out the cleaning fluid. The cleaning step is triggered by cleaning software of the beverage preparation module 1, based on an input made on an operating element, or in some other way.

REFERENCE NUMERALS

1 Beverage preparation module
11 Water connection
12 Preparation device
121 Bean hopper
122 Coffee boiler
123 Hot water boiler
124 Steam boiler
125 Coffee grinder
126 Coffee brewing unit
127 Water pump
13 Communication interface (local)
14 Control unit
15 Beverage outlet
16.1, 16.2, 16.3, 16.4 Additional module interfaces
17 Additional fluid interfaces
18 Outflow module interface
19 Monitoring interface (remote)
100 Module housing
2.1, 2.2, 2.3, 2.4 Additional modules
2.1 Milk module
2.11 Ingredient container for the milk module (milk container)
2.12 Milk module interface
2.13 Milk pump
2.14 Milk filling level monitor
2.15 Pinch valve
2.16 Air pump
2.17 Flush valve
2.19 Milk outlet
2.2 Powder module
2.21 Ingredient container for the powder module (powder container)
2.22 Powder module interface
2.23 Conveying device
2.24 Powder filling level monitor
2.25 Mixer
2.26 Water valve
2.29 Powdered beverage outlet
2.3 Syrup module
2.31 Ingredient container for the syrup module (syrup container)
2.32 Syrup module interface
2.33 Syrup pump 2.34 Syrup filling level monitor
2.39 Syrup outlet
2.4 Cleaning module
2.41 Ingredient container for the cleaning module (cleaner container)
3 Outflow module
31 Holder
32 Hoses
4 Drinking cup
5 Self-service operating element (touchscreen)
6 Water supply (water mains line/container)
7 Self-service beverage vending machine
71 Self-service dispensing area
72 Door
8 Cleaning basin
81 Cleaning fluid
82 Outlet opening
83 Submersion depth

The invention claimed is:

1. A self-service beverage vending machine, comprising:
a beverage cabinet defining an interior of said self-service beverage vending machine,
a beverage preparation module disposed within the beverage cabinet,
a holder for mounting the beverage preparation module,
one or more additional modules disposed within the beverage cabinet,
one or more holders for mounting the one or more additional modules,
an outflow module disposed within the beverage cabinet;
wherein the beverage preparation module is a self-contained beverage preparation module comprising:
a module housing configured to be removably disposed within said interior of said self-service beverage vending machine;
a water connection attached to the module housing to provide a water supply thereto;
a preparation device disposed within the module housing for preparing a beverage using water supplied to the water connection,
a communication interface and a control unit, provided to the module housing, to which beverage preparation parameters are transmittable via the communication interface, and which is configured for controlling the preparation device within the module housing in order to prepare a beverage based on the beverage preparation parameters,
a beverage outlet provided to the module housing for discharging the beverage prepared by the preparation device into a cup intended to be removed from said self-service beverage vending machine,
at least one module interface for connecting the control unit to the one or more additional modules, and
at least one fluid interface for connecting the water connection and the preparation device to the one or more additional modules, wherein the at least one fluid interface is configured for providing a fluid connection between the preparation device and the one or more additional modules, such that water, hot water, steam, or cleaning fluid can be exchanged between the preparation device and the one or more additional modules via the at least one fluid interface,
wherein the water connection, the preparation device, the communication interface, the control unit, the beverage outlet, the at least one module interface and the at least one fluid interface are provided in and/or on the module housing to form a unitary unit;
wherein the one or more additional modules includes one of the following: a milk module, a powder module, a syrup module, and a cleaning module, and wherein the one or more additional modules comprises: an additional module interface for connection to the at least one module interface of the beverage preparation module, the additional module interface being configured for transmitting electrical power and/or electrical control signals, and a water interface and/or steam interface for connection to the at least one fluid interface of the beverage preparation module; and
wherein the outflow module includes at least one of the following features: milk duct, steam duct, milk-steam mixing chamber, powdered beverage duct, coffee duct, and
wherein the at least one module interface and the at least one fluid interface are disposed on the beverage preparation module.

2. The self-service beverage vending machine according to claim 1, further comprising at least one of the following components: a water pump, a coffee boiler, a hot water boiler, a steam boiler, a coffee brewing unit, a coffee grinder, a drive device for a coffee brewing unit, a coffee grounds removal device, and a service operating unit.

3. The self-service beverage vending machine according to claim 1, wherein the at least one fluid interface is configured for one of the following connections: between a hot water boiler of the preparation device and the powder module, between a steam boiler of the preparation device and the milk module, between the preparation device and the cleaning module, between the cleaning module and the milk module, and between the cleaning module and the outflow module.

4. The self-service beverage vending machine according to claim 1, wherein the module housing has a sealed design.

5. The self-service beverage vending machine according to claim 4, wherein the module housing is completely or partially openable only using a special tool.

6. The according to claim 1, further comprising a monitoring interface for data transmission using a remote data transmission device for monitoring beverage preparation modules.

7. The self-service beverage vending machine according to claim 1, further comprising a data memory for storing operating data including the number of prepared beverages or the filling level of ingredient containers, and/or for storing beverage recipe data.

8. The self-service beverage vending machine according to claim 1, further comprising a cleaning software module for automatically cleaning the beverage preparation module and, if necessary, additional modules connected thereto.

9. The self-service beverage vending machine according to claim 1, further comprising a coordination software module for coordinating the preparation of beverages with external devices which cooperate with the beverage preparation module.

10. The self-service beverage vending machine according to claim 1, further comprising a function test software module for establishing which functions are carried out by the beverage preparation module and which functions are carried out by external devices which cooperate with the beverage preparation module.

11. The self-service beverage vending machine according to claim 1, further comprising a billing software component for billing prepared beverages.

12. The self-service beverage vending machine according to claim 1, further comprising an assistance software module for determining operation tasks which are to be carried out by operating personnel.

13. The self-service beverage vending machine according to claim 1, further comprising an equipment module for determining best suited additional modules and/or ingredient quantities.

14. The self-service beverage vending machine according to claim 1, wherein one or more components are exchangeably situated as a consumable part.

15. The self-service beverage vending machine according to claim 1, wherein the holder for the beverage preparation module and/or one or more additional modules is/are designed as a suspension device.

16. The self-service beverage vending machine according to claim 1, wherein a self-service operating element, in particular a touchscreen and preferably a personal computer connected thereto, is provided for inputting beverage preparation parameters and initiating the preparation of a beverage.

17. The self-service beverage vending machine according to claim 1, wherein a door is provided to allow access to the beverage preparation module and, if necessary, one or more access modules, in particular an operating element being pivotably provided so that the operating element remains usable even when the door is open.

18. The self-service beverage vending machine according to claim 17, wherein the door has a first closing device, and the beverage preparation module has a second closing device.

19. The self-service beverage vending machine according to claim 1, wherein during automatic cleaning of device components, a cleaning security system is provided to close off access to the device components being cleaned.

20. The self-service beverage vending machine according to claim 1, further comprising an advertising software module for playing advertising on a display of the self-service beverage vending machine.

21. The self-service beverage vending machine according to claim 1, further comprising a watchdog software module for monitoring that the options for selecting a beverage are always displayed on a self-service operating element.

22. The self-service beverage vending machine according to claim 1, further comprising a reference software module for displaying additional information on a display during the preparation of a beverage.

23. The self-service beverage vending machine according to claim 1, further comprising a housing face which is suitable for displaying additional information or advertising, the housing face in particular having an auxiliary display.

24. The self-service beverage vending machine according to claim 1, wherein the beverage preparation module is a coffee vending machine.

25. The self-service beverage vending machine according to claim 1, wherein the at least one fluid interface of the beverage preparation module is connectable to the outflow module.

* * * * *